(12) United States Patent
Fujimoto et al.

(10) Patent No.: US 6,612,929 B2
(45) Date of Patent: Sep. 2, 2003

(54) ROTARY DEVICE FOR GAME MACHINE AND GAME MACHINE WITH ROTARY DEVICE

(75) Inventors: Hirofumi Fujimoto, Kobe (JP); Yuji Tamura, Akashi (JP)

(73) Assignee: Konami Corporation, Tokyo (JP)

( * ) Notice: Subject to any disclaimer, the term of this patent is extended or adjusted under 35 U.S.C. 154(b) by 37 days.

(21) Appl. No.: 09/800,008

(22) Filed: Mar. 6, 2001

(65) Prior Publication Data

US 2001/0021667 A1 Sep. 13, 2001

(30) Foreign Application Priority Data

Mar. 7, 2000 (JP) ........................................ 2000-061718

(51) Int. Cl.⁷ ................................................ A63F 13/06
(52) U.S. Cl. .......................................... 463/32; 463/37
(58) Field of Search ............................... 463/36, 37, 32, 463/33; 188/161, 163; 703/8; 273/148 B

(56) References Cited

U.S. PATENT DOCUMENTS

| 5,713,792 A | 2/1998 | Ohzono et al. ................. 463/7 |
| 6,088,019 A | 7/2000 | Rosenberg ................... 345/156 |
| 6,283,859 B1 * | 9/2001 | Carlson et al. ............... 463/36 |

FOREIGN PATENT DOCUMENTS

| EP | 0680132 | 11/1995 | | |
| EP | 0867348 | 9/1998 | | |
| JP | 64-007671 | 2/1989 | | |
| JP | 1-054711 | 11/1989 | | |
| JP | 04232829 | 8/1992 | | |
| JP | 07293620 | 11/1995 | | |
| JP | 08117441 | 5/1996 | | |
| JP | 08-234651 | 9/1996 | | |
| JP | 08292712 | 11/1996 | | |
| JP | 2704642 | 10/1997 | | |
| JP | 10-171542 | * | 6/1998 | .......... G05D/24/02 |
| JP | 10184758 | 7/1998 | | |
| JP | 2000056668 | 2/2000 | | |
| JP | 2000210467 | 8/2000 | | |
| WO | WO 99/66997 | 12/1999 | | |

* cited by examiner

*Primary Examiner*—Andrew M. Dolinar
(74) *Attorney, Agent, or Firm*—Jordan and Hamburg LLP

(57) ABSTRACT

A rotary device for a game machine, comprises a rotatable member rotatable by a game player, a rotatable shaft having the rotatable member mounted thereon, a bias unit for biasing the rotatable shaft to its neutral position thereof, and a braking unit having a contacting member and a contacted member which are opposed to each other and adapted to give a rotational resistance to the rotatable shaft based on a contact resistance created by a variation of a distance between the contacting member and the contacted member.

13 Claims, 12 Drawing Sheets

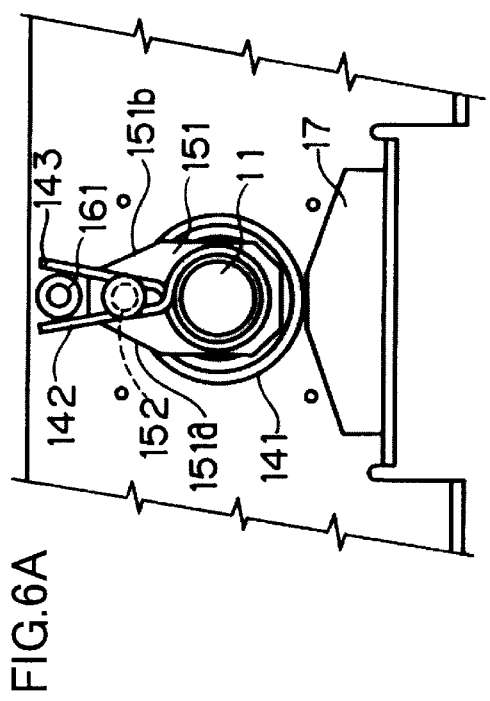
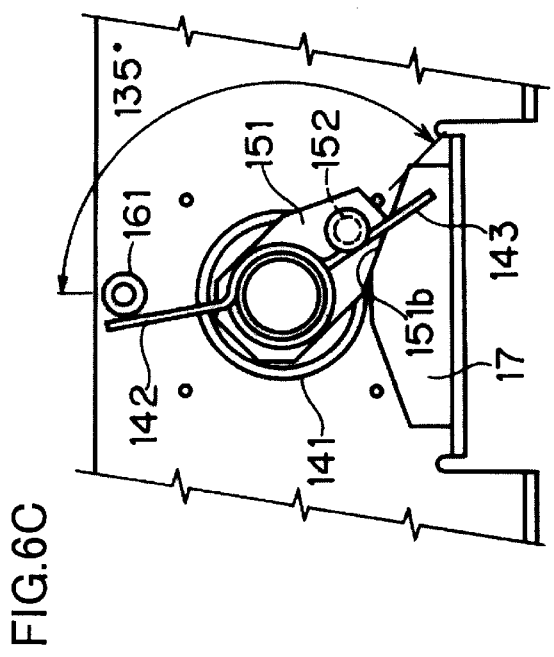
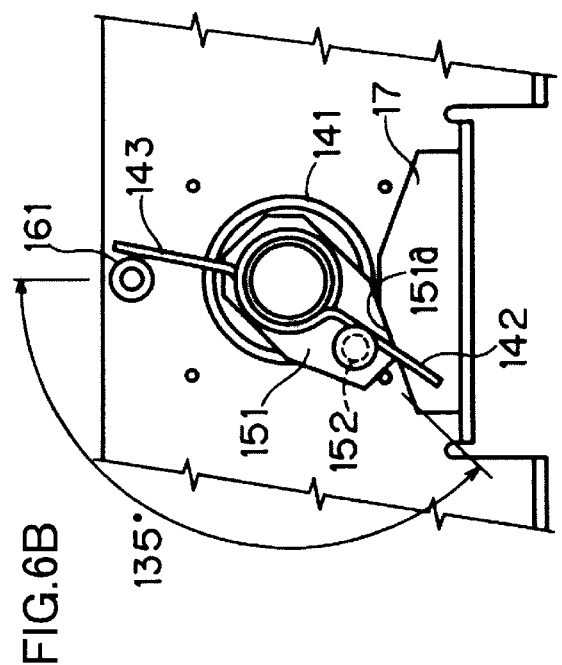
FIG.6A
FIG.6B
FIG.6C

ROTARY DEVICE FOR GAME MACHINE AND GAME MACHINE WITH ROTARY DEVICE

The present invention relates to a rotary device used in driving game machines in which a simulated car is steered on simulated roads displayed on a monitor and like game machines in which other rotational operations are made. The present invention relates also to a game machine with the aforementioned rotary device.

BACKGROUND OF THE INVENTION AND RELATED ART STATEMENT

Driving game machines have been known in which simulated roads and a simulated car are displayed on a monitor, and a steering wheel provided in front of the monitor is operated to change the direction of the simulated car according to a curved or winding degree of the simulated roads.

In such driving game machines, forces which act on the steering wheel when an automobile is actually driven are created in a simulated manner. For example, there are known a technique of giving a rotational reaction force, which increases as the steering wheel is rotated to either left or right side from its neutral position, to the steering wheel or steering shaft and a technique of shaking the steering wheel in forward and backward directions within a specified range in the case that the simulated car contacts or collides with another car or a wayside obstacle displayed on the monitor in a simulate manner. Electric motors have been conventionally used as a means for shaking the steering wheel in forward and backward directions within a specified range. If a small electric motor is used, there is a problem of relatively easily damaging the electric motor by a rotational force of the steering wheel exerted by a game player. In order to solve such a problem, a large motor having a relatively large torque is necessary. However, such a motor disadvantageously leads to a narrow space around the steering shaft and a higher price.

In view of the problems residing in prior art, an object of the present invention is to provide a rotary device for a game machine which device can suppress an occurrence of breakdown and can be smaller and inexpensive.

SUMMARY OF THE INVENTION

In order to fulfill the above object, a rotary device for a game machine, according to the present invention, comprises:
  a rotatable member rotatable by a game player,
  a rotatable shaft having the rotatable member mounted thereon,
  a bias unit for biasing the rotatable shaft to its neutral position thereof, and
  a braking unit having a contacting member and a contacted member which are opposed to each other and adapted to give a rotational resistance to the rotatable shaft based on a contact resistance created by a variation of a distance between the contacting member and the contacted member.

These and other objects, features and advantages of the present invention will become more apparent upon a reading of the following detailed description and accompanying drawings.

BRIEF DESCRIPTION OF THE DRAWINGS

FIGS. 6A, 6B and 6C are diagrams showing a steering shaft provided in the driving game machine and its neighborhood when viewed in longitudinal direction, wherein FIG. 6A shows a state where the steering wheel is in its neutral position, FIG. 6B shows a state where the steering wheel is rotated to the left by 135° and FIG. 6C shows a state where the steering wheel is rotated to the right by 135°, respectively.

DETAILED DESCRIPTION OF THE PREFERRED EMBODIMENTS OF THE INVENTION

Hereinafter, one embodiment of the present invention is specifically described.

Figure 1:
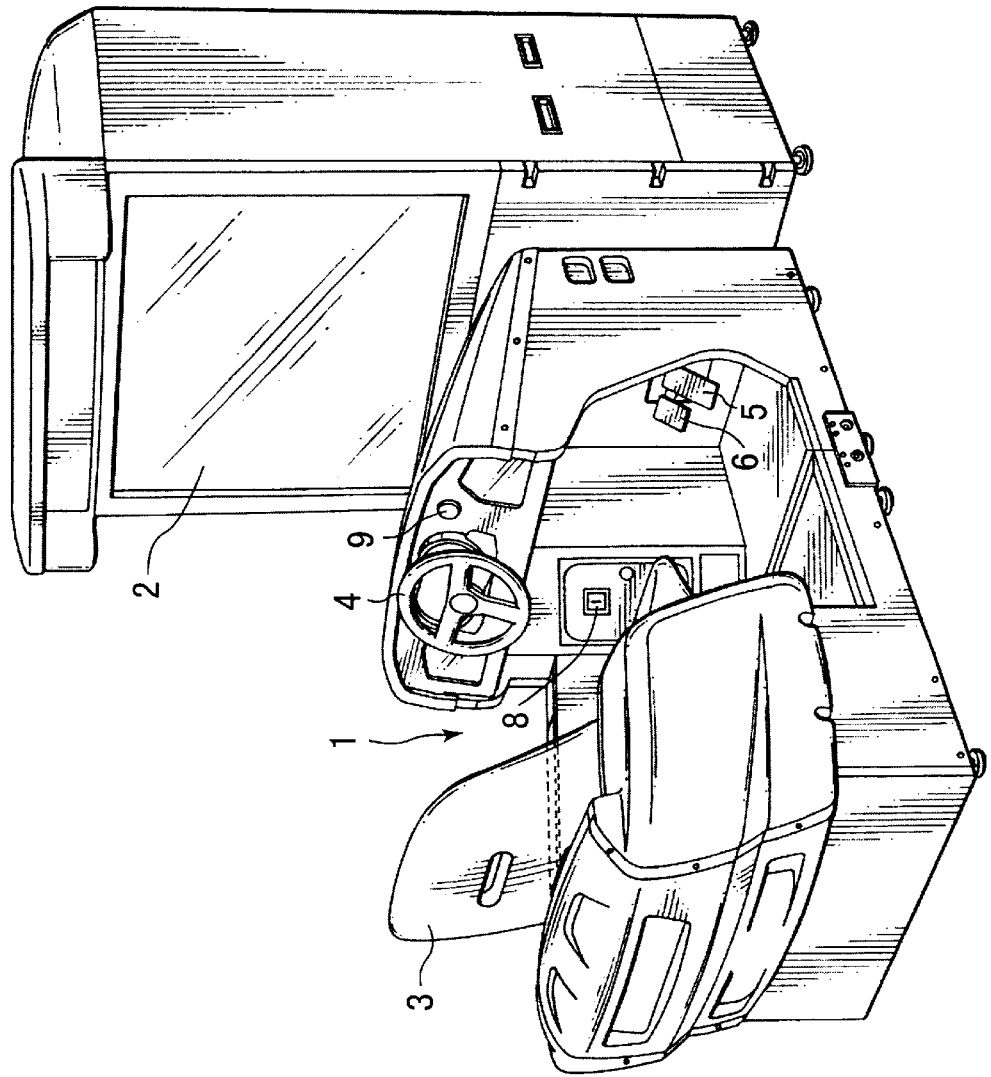
FIG. 1 is a perspective view of a driving game machine employing a rotary device according to one embodiment of the present invention.

FIG. 1 is a perspective view of a driving game machine employing a rotary device according to one embodiment of the present invention. This driving game machine is comprised of a driver's seat 1 and a monitor 2. Similar to a driver's seat of an automobile, the driver's seat 1 is provided with a seat 3, a steering wheel 4 as a rotatable member, an acceleration pedal 5 and a brake pedal 6. The driver's seat 1 is also provided with a coin slot 8 for inserting a coin at the left side in front of the seat 3, and a start switch 9 for instructing the start of a game at the right side of the steering wheel 4.

Figure 2:
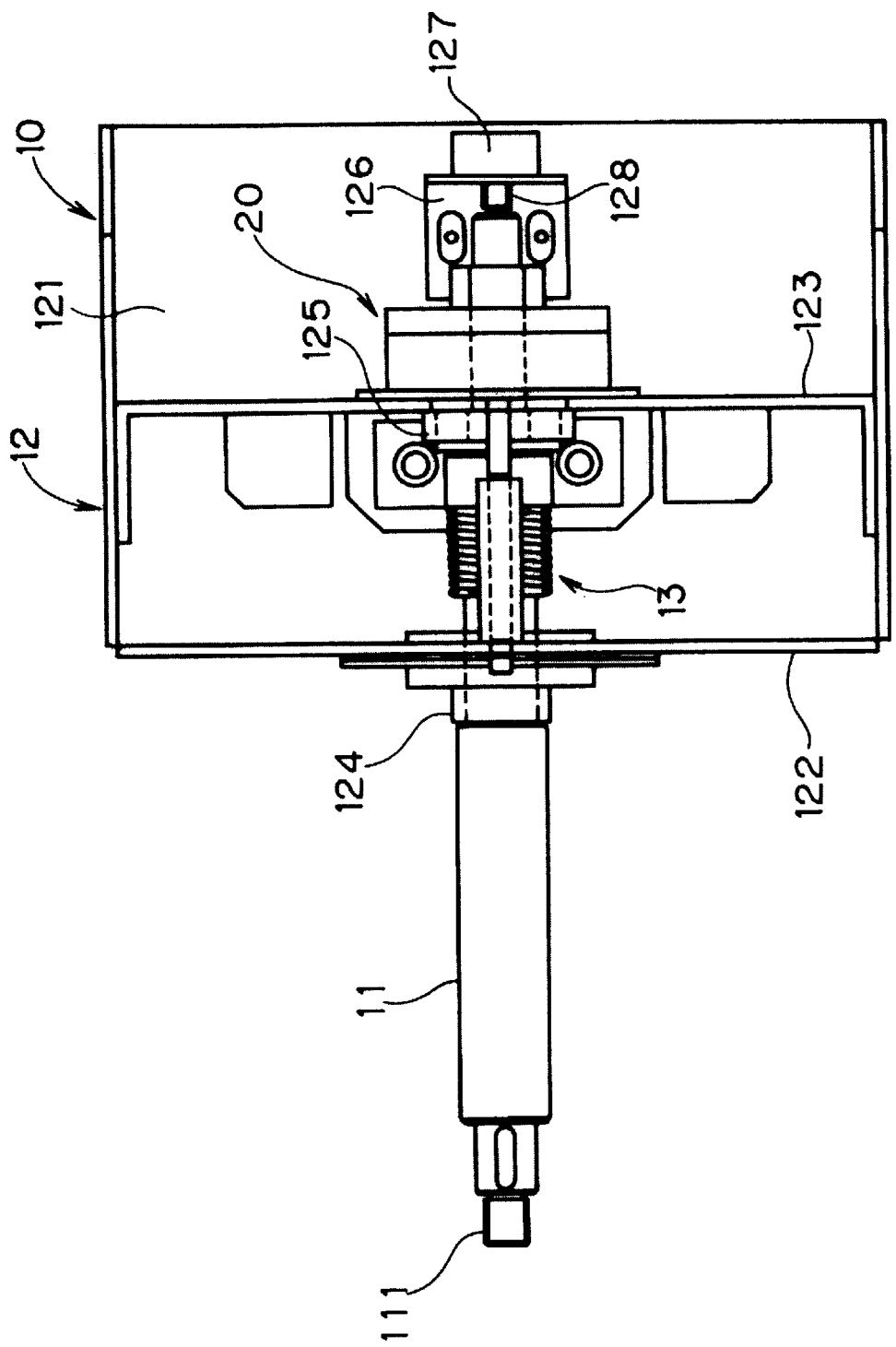
FIG. 2 is a plan view showing a steering device on which a steering wheel of the driving game machine is mounted.
Figure 3:
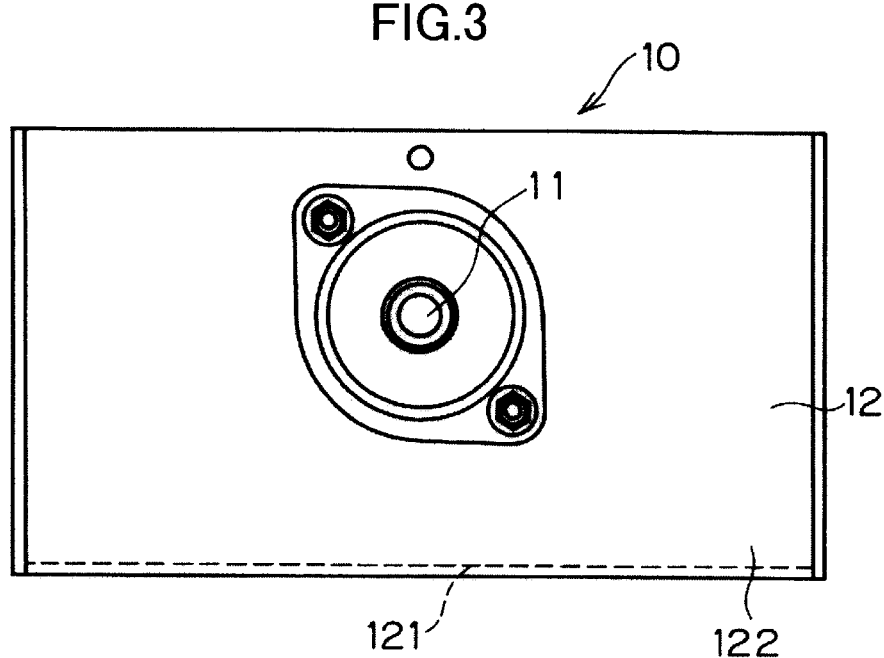
FIG. 3 is a left side view of the steering device of FIG. 2.
Figure 4:
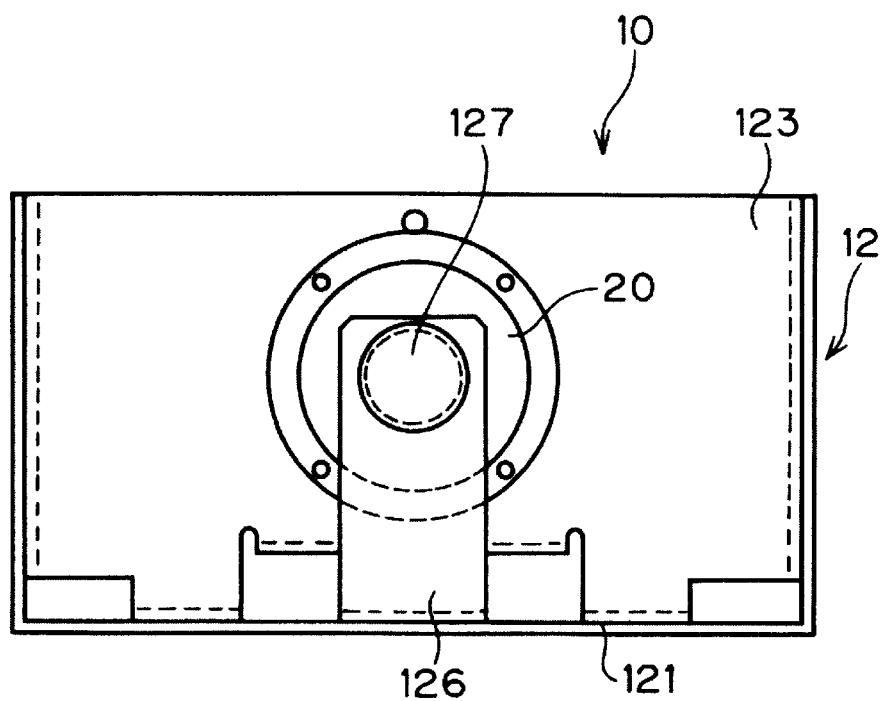
FIG. 4 is a right side view of the steering device of FIG. 2, FIGS. 5A and 5B are a plan view and a front view showing a reaction force giving means provided in the driving game machine, respectively.

FIG. 2 is a plan view showing a steering device on which a steering wheel of the driving game machine is mounted, FIG. 3 is a left side view of the steering device of FIG. 2, and FIG. 4 is a right side view of the steering device of FIG. 2.

This steering device 10 is provided with a steering shaft 11 as a rotatable shaft, a box-shaped supporting member 12 for rotatably supporting the steering shaft 11, a reaction force giving means 13 provided in an intermediate position of the steering shaft 11, and an electromagnetic brake 20 as a braking unit provided also in an intermediate position of the steering shaft 11.

The supporting member 12 includes a base plate 121 and a pair of facing plates 122, 123 standing from the base plate 121, and the steering shaft 11 is rotatably supported in forward and backward directions by a bearing 124 provided in the facing plate 122 and a bearing 125 provided in the facing plate 123. A sensor mounting member 126 having an L-shaped cross section is secured to the base plate 121, and a wheel rotation detector 127 is mounted on the sensor mounting member 126. The detector 127 is concentrically mounted on an end of the steering shaft 11 and has a detecting portion 128 which rotates together with the steering shaft 11. The detector 127 detects an angle of rotation of the steering shaft 11 based on an angle of rotation of the detecting portion 128. The steering shaft 11 has a wheel mounting portion 11 provided at one end thereof (left end in FIG. 2), and the steering wheel 4 is mounted on the wheel mounting portion 111.

The reaction force giving means 13 (hereinafter also referred to as a bias unit) is provided with a spring 14, a spring twisting member 15 which is secured to the steering shaft 11 to rotate therewith, and a stopper member 16 mounted on the facing plate 123 of the supporting member 12 for supporting the steering shaft 11.

The spring 14 includes a coiled portion 141 and locking portions 142, 143 which are opposite ends of the spring 14 projecting outwardly, and the steering shaft 11 is inserted through the coiled portion 141.

The stopper member 16 includes a spring locking portion 161 projecting toward the spring 14 from the supporting member 12 along the longitudinal direction of the steering shaft 11 and having a circular cross section. The spring twisting member 15 is mounted on the steering shaft 11 and includes a mounting portion 151 mounted on the steering shaft 11 to rotate therewith, and a spring locking portion 152 projecting toward the spring 14 from the mounting portion 151 along the longitudinal direction of the steering shaft 11 and having a circular cross section.

A distance from the center of the steering shaft 11 to that of the spring locking portion 152 is set shorter than a distance from the center of the steering shaft 11 to that of the spring locking portion 161. Further, a distance from the center of the steering shaft 11 to the locking portions 142 and 143 of the spring 14 is set longer than the distance from the center of the steering shaft 11 to that of the spring locking portion 161.

FIGS. 6A, 6B and 6C are diagrams showing the steering shaft 11 provided in the driving game machine and its neighborhood when viewed in longitudinal direction, wherein FIG. 6A shows a state where the steering wheel 4 is in its neutral position, FIG. 6B shows a state where the steering wheel 4 is rotated to the left by 135° and FIG. 6C shows a state where the steering wheel is rotated to the right by 135°, respectively.

The coiled portion 141 of the spring 14 has an inner diameter slightly larger than the outer diameter of the steering shaft 11, so that the steering shaft 11 is loosely fitted in the coiled portion 141. The respective locking portions 142, 143 project outwardly in directions substantially normal to the longitudinal axis of the coiled portion 141, and the spring locking portions 152, 161 are located between the locking portions 142, 143 when the steering wheel 4 is in its neutral position. At this time, the respective diameters are preferably set such that the spring locking portions 152, 161 are in contact with the locking portions 142, 143, and the locking portions 142, 143 are preferably pushing the spring locking portions 152, 161 or in contact therewith.

When the steering wheel 4 is rotated to the left from the neutral position, the spring locking portion 152 is rotated to the left as the steering shaft 11 is rotated as shown in FIG. 6B, thereby rotating the locking portion 142 to the left to twist the coiled portion 141 of the spring 14. At this stage, the locking portion 143 remains engaged with the stationary spring locking portion 161. Thus, the coiled portion 141 gives a force for returning the steering shaft 11 to the neutral position to the steering shaft 11 via the spring locking portion 152 upon receipt of a twisting force. Therefore, the steering shaft 11 is returned to the neutral position by the twisting force of the coiled portion 141 if, for example, the game player's hands leave the steering wheel 4 in this state.

Figure 5A:
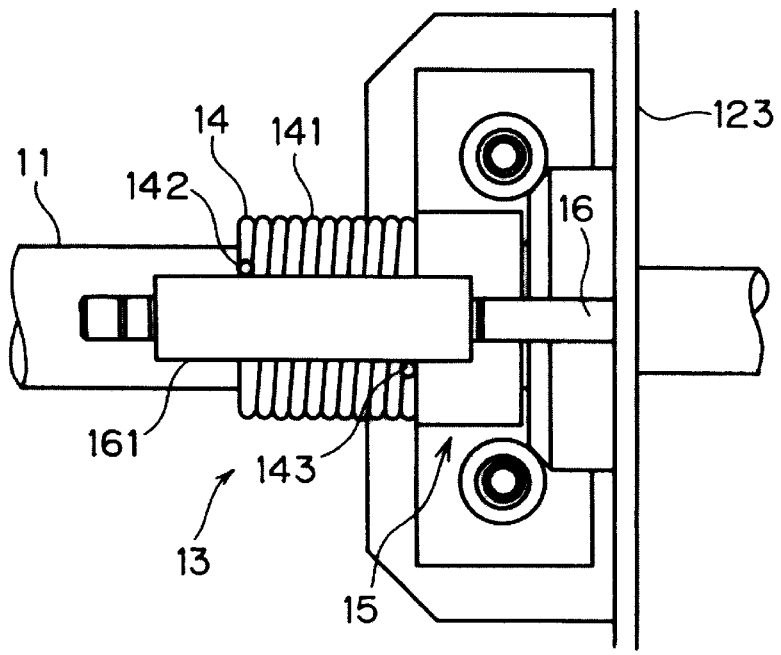
Figure 5B:
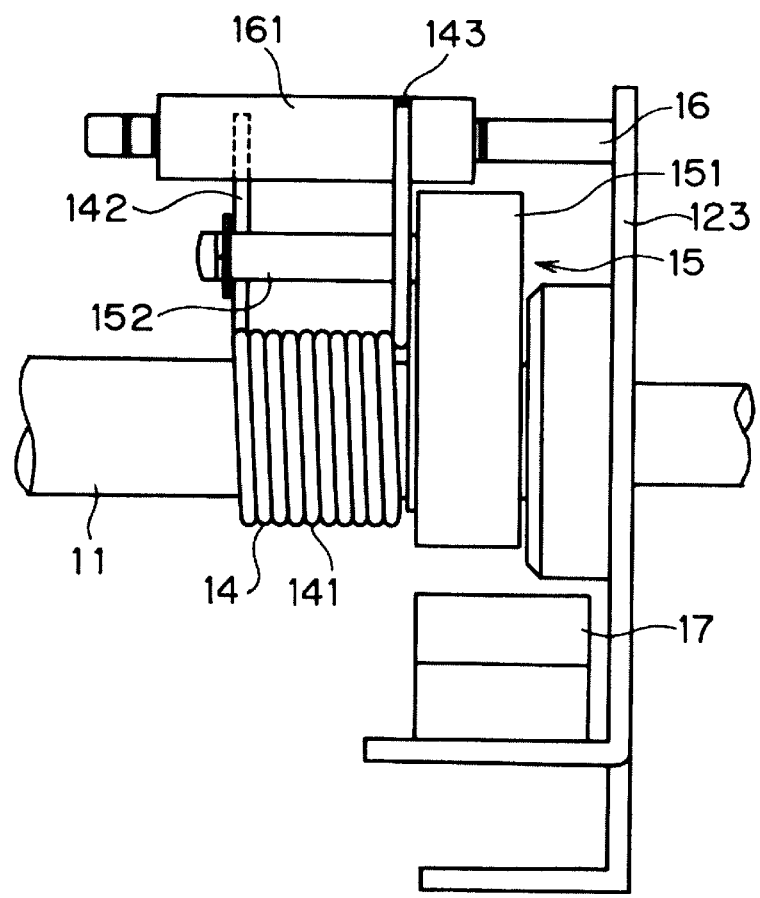

Conversely, when the steering wheel 4 is rotated to the right from the neutral position, the spring locking portion 152 is rotated to the right as the steering shaft 11 is rotated as shown in FIG. 6C, thereby rotating the locking portion 143 to the right to twist the coiled portion 141 of the spring 14. At this stage, the locking portion 142 remains engaged with the stationary spring locking portion 161. Thus, the coiled portion 141 gives a force for returning the steering shaft 11 to the neutral position to the steering shaft 11 via the spring locking portion 152 upon receipt of a twisting force. Therefore, the steering shaft 11 is returned to the neutral position by the twisting force of the coiled portion 141 if, for example, the game player's hands leave the steering wheel 4 in this state. The mounting portion 151 includes contact surfaces 151a, 151b slanted with respect to both rotating directions. The contact surface 151a comes into contact with a stopper 17 when the steering wheel 4 is rotated to the left by 135° as shown in FIG. 5B, whereas the contact surface 151b comes into contact with the stopper 17 when the steering wheel 4 is rotated to the right by 135° as shown in FIG. 5C. Therefore, the steering wheel 4 is rotatable within an angle range of 135° to the left and right from the neutral position.

Figure 7:
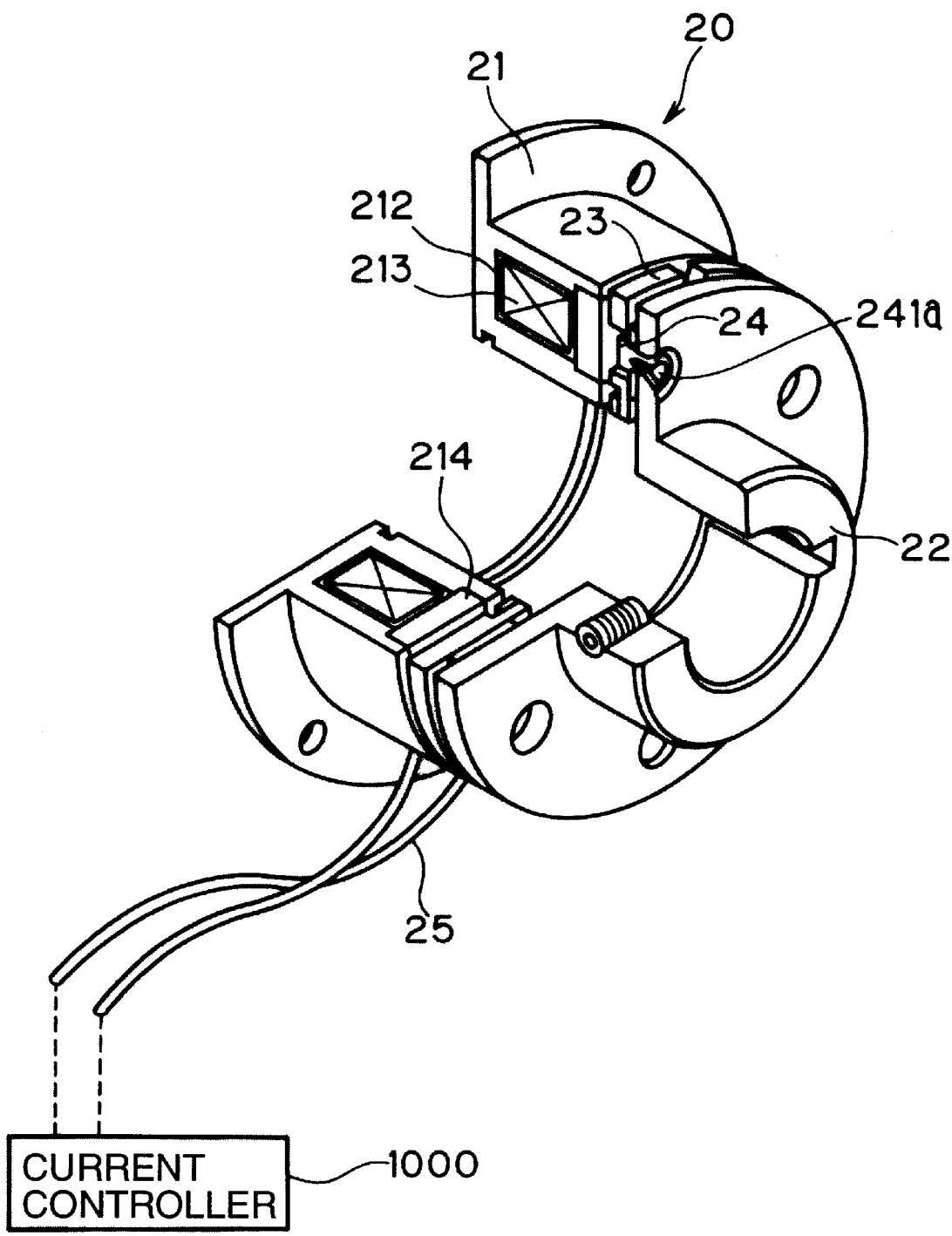
FIG. 7 is a perspective view (partly cut away) showing an electromagnetic brake provided in the driving game machine.
Figure 8B:
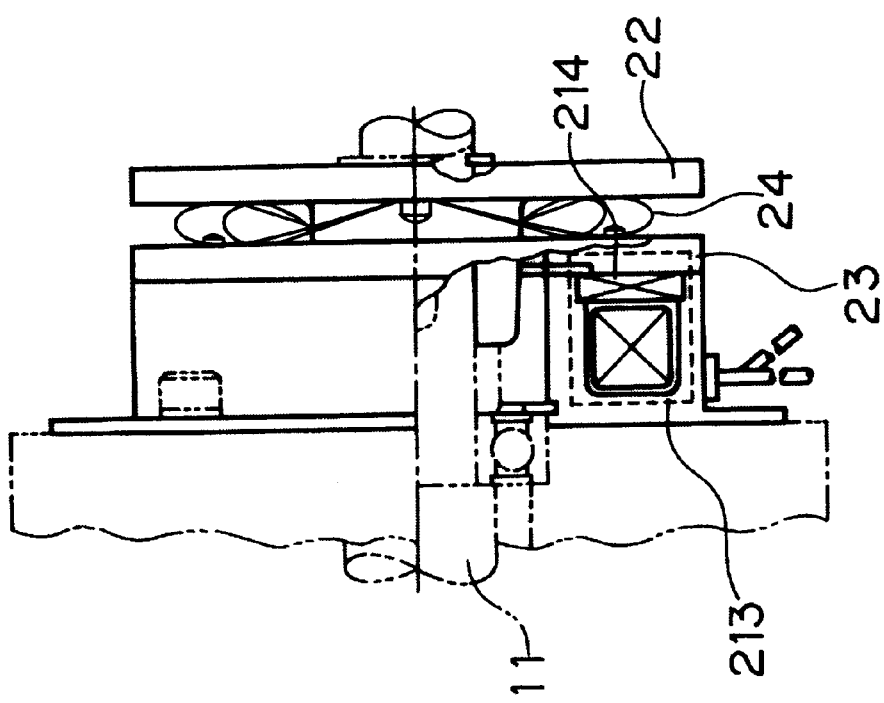
FIGS. 8A and 8B are sections showing the operation of the electromagnetic brake of FIG. 7 in its free state and in its braking state.
Figure 8A:
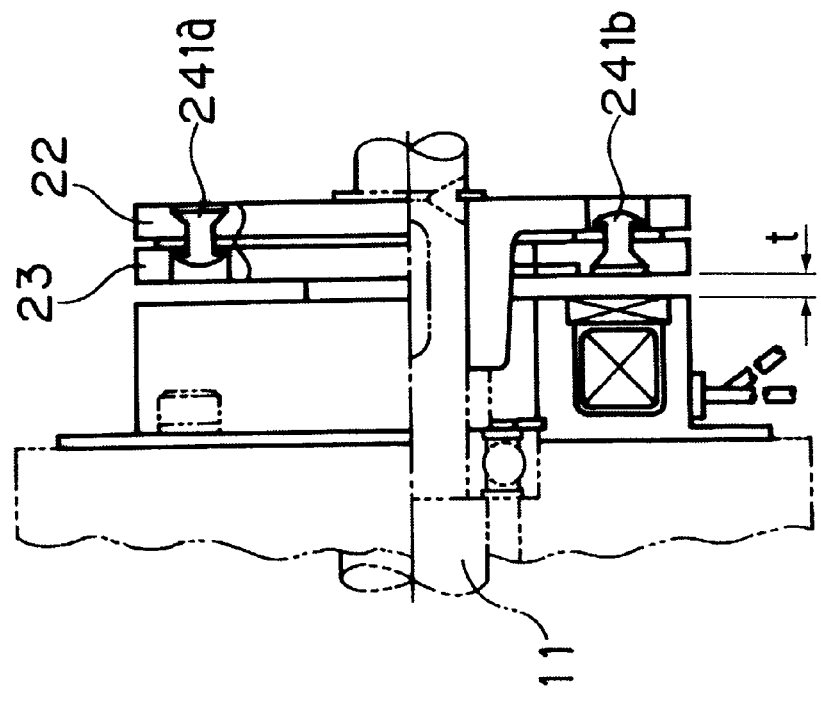

FIG. 7 is a perspective view (partly cut away) showing the electromagnetic brake, and FIGS. 8A and 8B are sections showing the operation of the electromagnetic brake in its free state and in its braking state.

A known electromagnetic brake, e.g. 111-08-11 (manufactured by Miki Pulley K.K.) is used as the electromagnetic brake 20. This electromagnetic brake 20 includes a stator 21 as an electromagnetic force generator which is mounted on the facing plate 123 of the supporting member 12 and has an annular cross section, an armature hub 22 mounted on the steering shaft 11 and having an annular cross section, and an armature 23 and a leaf spring 24 both provided between the stator 21 and the armature 22 and having an annular cross section. Here, the armature hub 22, the armature 23 and the leaf spring 24 construct an electromagnetic force receiving portion.

Figure 9:
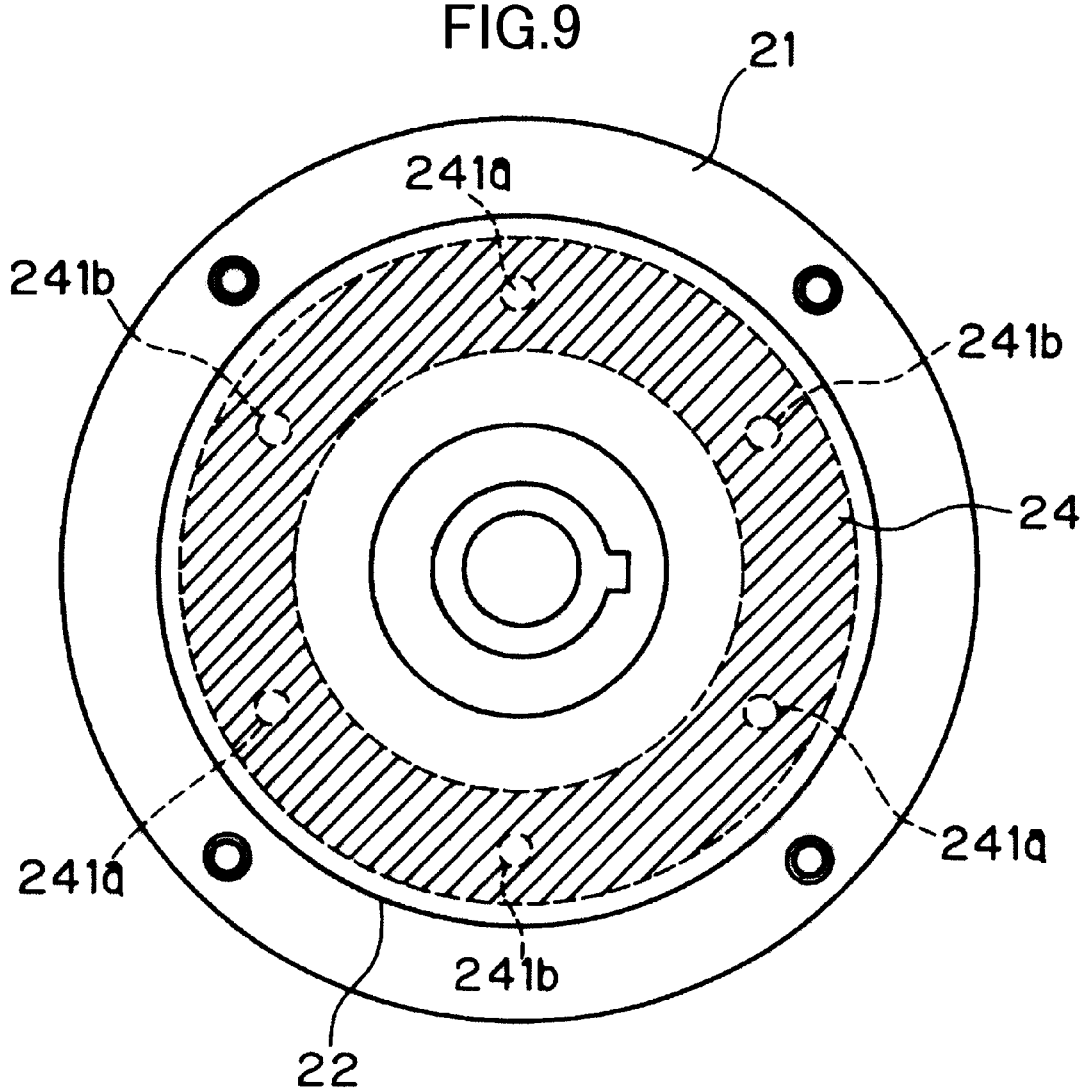
FIG. 9 is a front view of a leaf spring of the electromagnetic brake provided in the driving game machine.

The leaf spring 24 is ring-shaped as shown by hatching in FIG. 9 and is secured to the armature 23 and the armature hub 22 by screws 241a, 241b provided in a plurality of positions, e.g. 6 positions spaced apart in circumferential direction. The leaf spring 24 are alternately secured to the armature 23 and the armature hub 22 by the screws 241a, 241b. The screws 241a are adapted to secure the leaf spring 24 to the armature hub 22, whereas the screws 241b are adapted to secure it to the armature 23 (see FIG. 8).

The stator 21 has a circular hollow 212, and a coil 213 and a lining 214 are provided inside the hollow 212 from the back side. A current is supplied to the coil 213 from a current controller 1000 via a lead wire 25. The lining 214 is provided to secure a frictional force, and its outer surface slightly projects from the surface of the stator 21 toward the armature hub 22, and the armature 23 is opposed to the lining 214.

A suitable clearance t is defined between the lining 214 and the armature 23 (see FIG. 8: clearance t is drawn exaggeratedly large). While a current is being supplied to the coil 213, the armature 23 is pulled toward the coil 213 by a magnetic flux from the coil 213 to stick to the lining 214, thereby creating a frictional force and the leaf spring 24 is warped as shown in FIG. 8B. The frictional force is transmitted as a braking torque to the steering shaft 11 via the armature 23, the leaf spring 24 and the armature hub 22, with the result that the steering wheel 4 is braked. Here, the armature 23 constructs a contacting member, and the lining 214 and a portion of the stator 21 near the outer surface of the lining 214 construct a contacted member.

On the other hand, when no current is supplied to the coil 213, the magnetic flux disappears, and the armature 23 is momentarily freed from the lining 214 due to a restoring force of the warped leaf spring 24 as shown in FIG. 8A, with the result that no more frictional force acts to free the steering shaft 11. At this stage, the armature 23 is held by the leaf spring 24 to define the specified clearance t between the armature 23 and the lining 214. Thus, the steering wheel 4 can be freely rotated.

Accordingly, the electromagnetic brake 20 is in the state shown in FIG. 8A when no current is supplied while being in the state shown in FIG. 8B while a current is being supplied.

Figure 10:
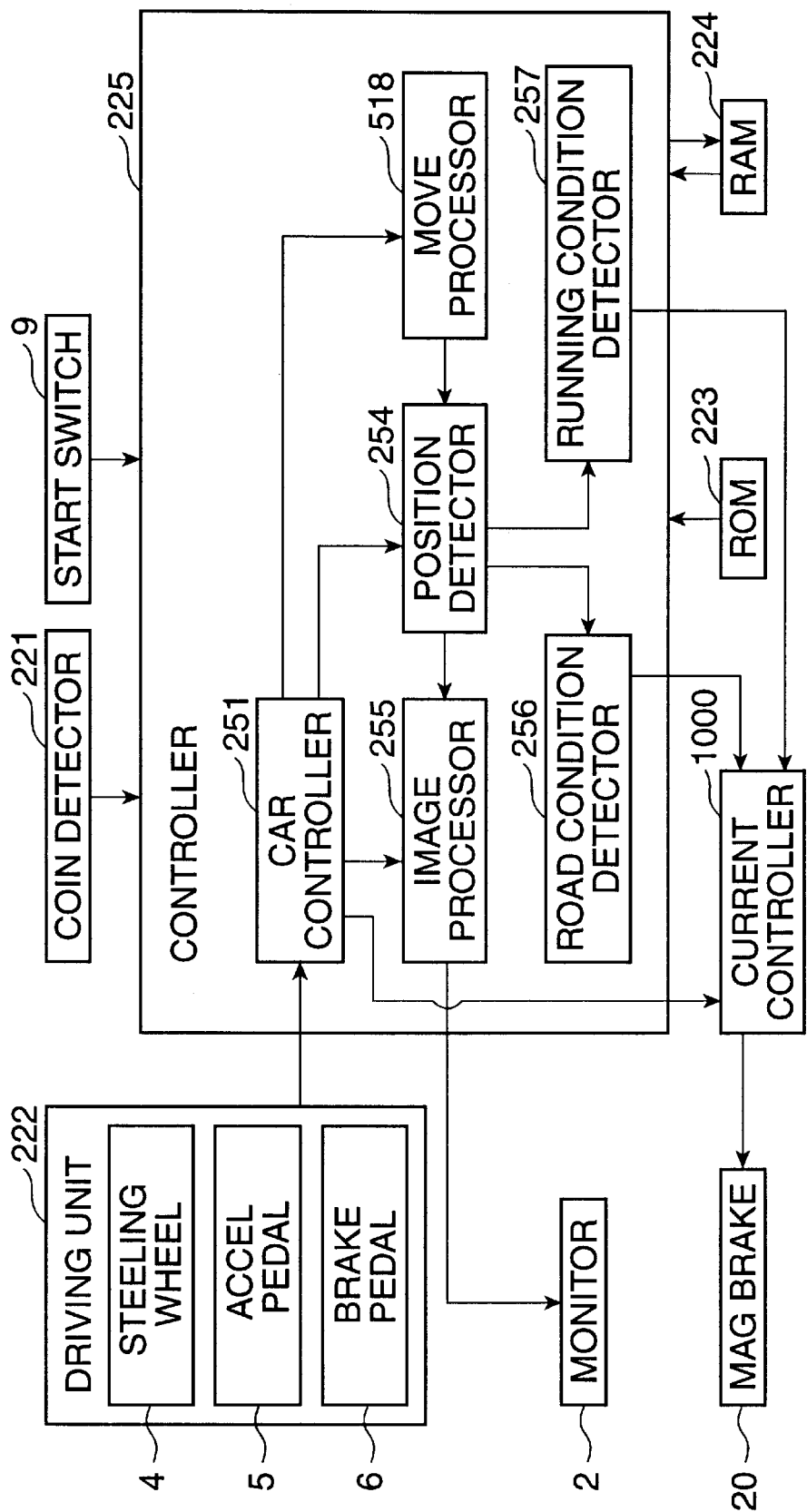
FIG. 10 is a block diagram showing a control system for controlling the driving game machine.
Figure 11:
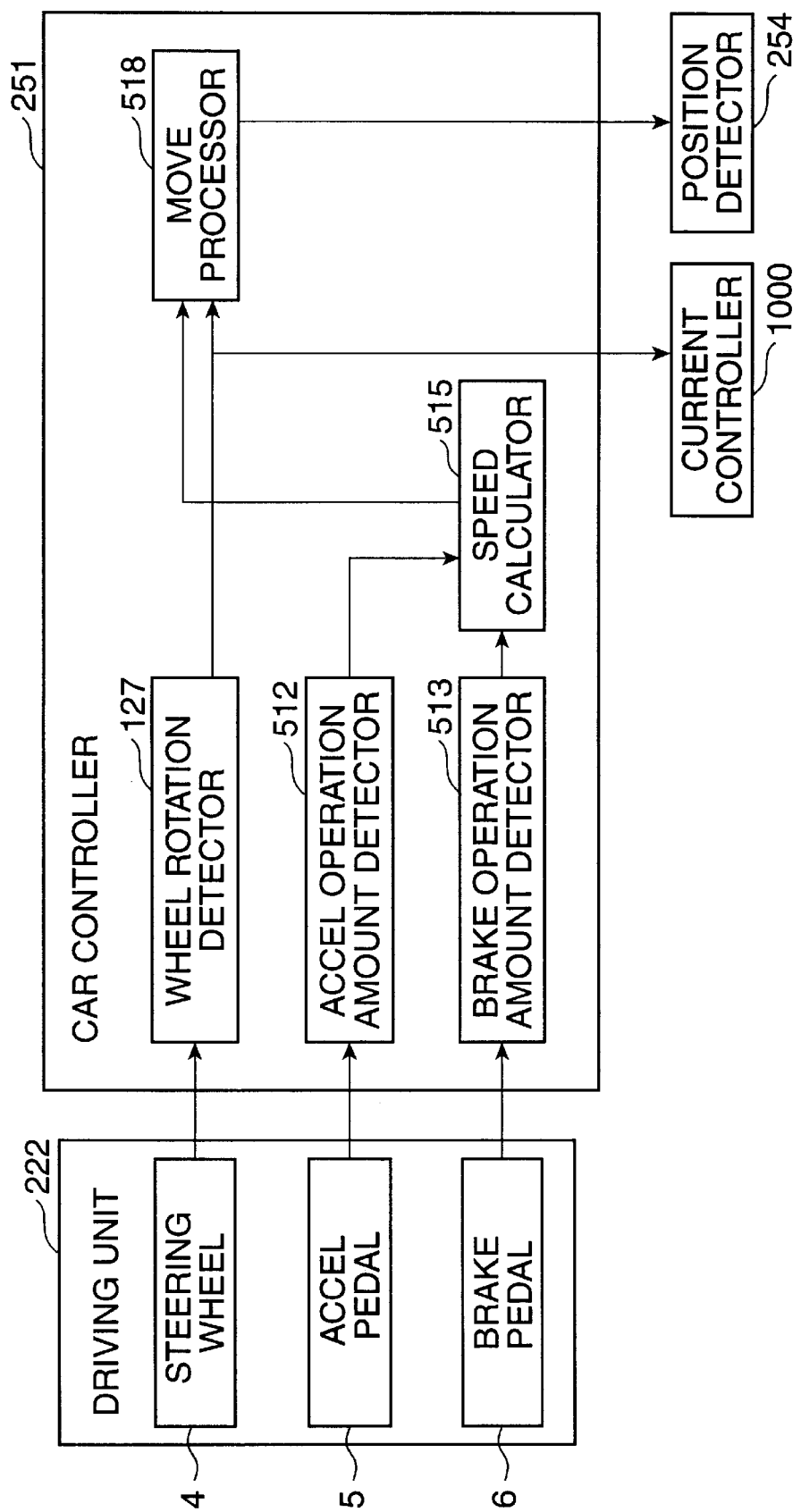
FIG. 11 is a block diagram showing a car controller of the control system for controlling the driving game machine.

FIGS. 10 and 11 are block diagrams showing a control system for controlling the driving game machine according to this embodiment.

This control system is provided with the monitor 2, the start switch 9, a coin detector 221, a driving unit 222, a ROM 223, a RAM 224 and a control unit 225. The monitor 2 is provided in such a position easily seeable by a game player sitting on the seat 3 at the front side of the driver's seat 1 and displays images by means of a CRT, a LCD, a projector or the like.

The start switch 9 is operated by the game player. When this start switch 9 is pushed by the game player, a corresponding switch signal is sent to the control unit 225.

The coin detector 221 detects a coin inserted into the coin slot 8 and its detection signal is set to the control unit 225.

The driving unit 222 is comprised of the steering wheel 4, the acceleration pedal 5 and the brake pedal 6 as shown in FIG. 11, Operation data on the operated amounts of the respective parts 4 to 6, i.e. an angle of rotation of the steering wheel 4, stepped degrees of the acceleration pedal 5 and the brake pedal 6 are converted into voltages of corresponding levels, and are respectively sent to a wheel rotation amount detector 127, an accelerative operated amount detector 512 and a braking operated amount detector 513.

Figure 12:
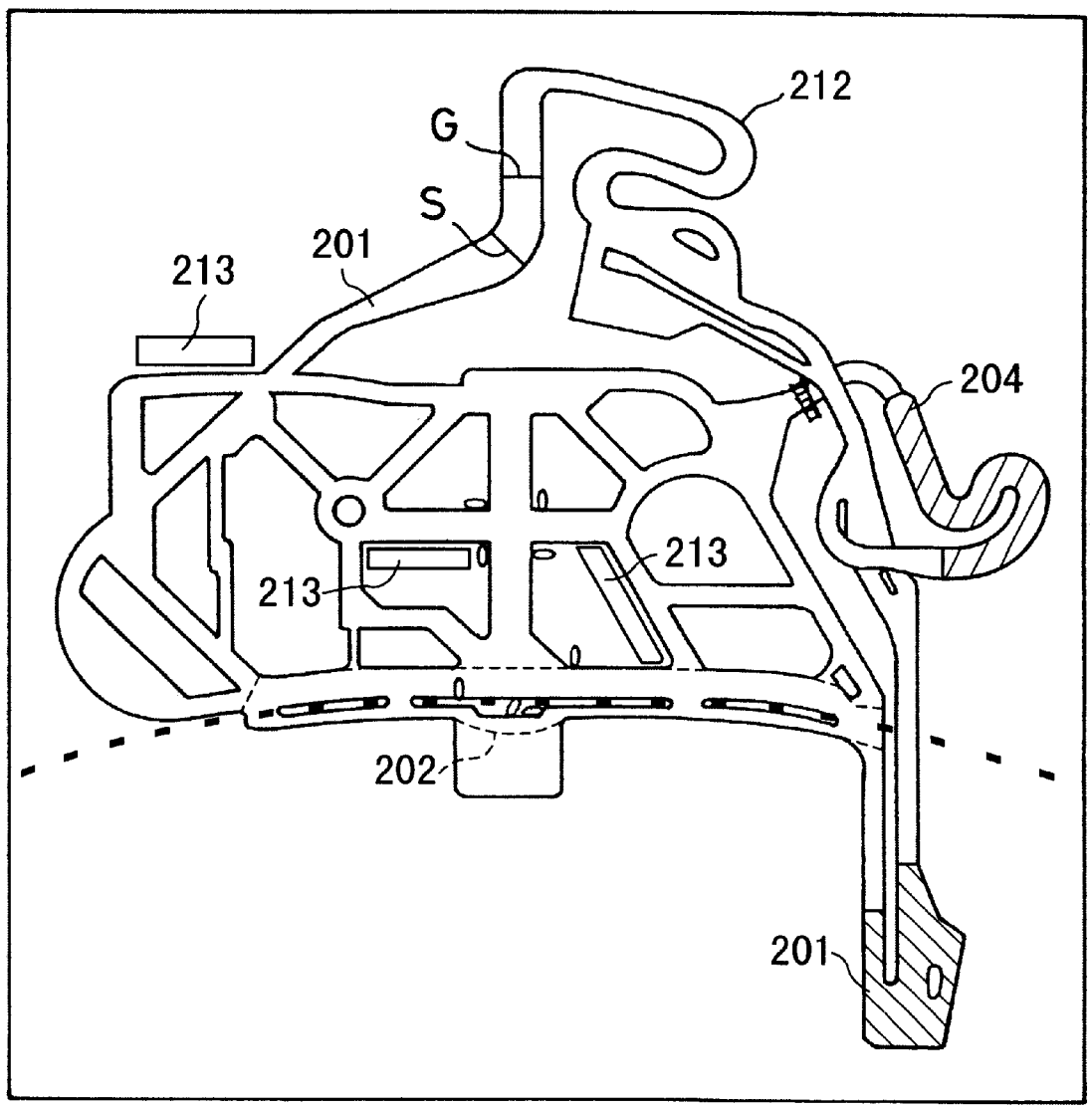
FIG. 12 is a diagram showing coordinate data of roads, coordinate data of buildings and the like near the roads, and data concerning road conditions provided in the control system.

The ROM 223 stores a program of the driving game, coordinate data of simulated roads 212, simulated buildings 213 and the like near the roads 212 shown in FIG. 12, data on road conditions at the respective sections of the roads 212, i.e. types of the roads including asphalt roads 201 (unhatched parts), gravel roads 201, a railway track 202, a grass field 204 and positions of the respective types of the roads, data on radii of curvature of curves of the roads 212, data on angles of inclination of bumps of the roads 212, data on whether or not the simulated car will jump and jumping heights based on a vehicle speed calculated by a vehicle speed calculator 515 to be described later and the data on the angle of inclination of the bumps of the roads 212, and programs concerning automotive behaviors in accordance with the automotive engineering. The RAM 224 temporarily stores data, etc.

The programs concerning the automotive behavior in accordance with the automotive engineering include a program concerning automotive behaviors according to a vehicle speed when an automobile scrapes against a wall of the building 213 or the like, a program concerning automotive behaviors when the automobile lands after jumping based on the vehicle speed and the angle of inclination of the bump of the road 212, and a program concerning automotive behaviors when the automobile explodes.

The control unit 225 is comprised of a CPU, logic circuit, etc., performs various calculations in a specified sampling cycle, controls the operations of the respective parts using the calculation results and displays images on the monitor 2. The control unit 225 further discriminates whether a coin has been inserted into the coin slot 8 based on the presence or absence of the detection signal sent from the coin detector 221, and discriminates whether the game player has pushed the start switch 9 based on the presence or absence of the switch signal from the start switch 9.

The control unit 225 includes a car controller 251. The car controller 251 controls driving of the simulated car operated by the game player (hereinafter, merelz "simulated car" unless otherwise specified) using the operation data of the respective parts sent from the driving unit 222 and various data and the programs concerning automotive behaviors in accordance with the automotive engineering which are stored in the ROM 223. As shown in FIG. 11, the car controller 251 is provided with the wheel rotation detector 127, the accelerative operated amount detector 512, the braking operated amount detector 513, the vehicle speed calculator 515 and a movement processor 518.

The wheel rotation detector 127, the accelerative operated amount detector 512, the braking operated amount detector 513 are each provided with an analog-to-digital (A/D) converter and the like, and detect the operated amounts of the steering wheel 4, the acceleration pedal 5 and the brake pedal 6 of the driving unit 222 sent therefrom. The movement processor 518 performs a movement processing for the simulated car using the detected operated amount of the steering wheel 4, the calculated vehicle speed, and the programs concerning automotive behaviors in accordance with the automotive engineering which are stored in the ROM 223.

The control unit 225 is also provided with a position detector 254, a road condition discriminator 256, a running condition discriminator 257 and an image processor 255.

The position detector 254 searches the position of the simulated car present within a view set in a virtual space and sends a searched position data of the simulated car within the view to the road condition discriminator 256 and the running condition discriminator 257.

The road condition discriminator 256 discriminates the condition of the road the simulated car is running based on the position data of the simulated car, the coordinate data of the roads 212 stored in the ROM 223, and the data concerning the types of the roads 212 such as the asphalt roads 201 (unhatched parts), the gravel roads 201, the railway track 202, the grass field 204 and the positions of the respective types of the roads, and sends predetermined identification signals (No. 1 to No. 9 described later) to the current controller 1000 and the image processor 255 for the respective discriminated types of the roads. For example, the identification signal NO. 1 is outputted in the case of the asphalt road 201, and the identification signal No. 2 representing a bumpy road is outputted in the case of the gravel road 201, the rail track 202 and the grassy field 204. Here, the virtual space is referred to as a space necessary for the game including the roads on which the simulated car runs and all the buildings and the like near the roads which are obtained based on various data.

The running condition discriminator 257 discriminates whether drift driving is to be performed and whether a rotational resistance according to an angle of rotation of the steering wheel 4 should be given based on the position data of the simulated car, the vehicle speed data, the coordinate data of the roads 212 stored in the ROM 223 and the data on the radii of curvature of the curves of the roads 212. The running condition discriminator 257 sends a specified identification signal No. 3 to the current controller 1000 and the image processor 255 to reduce a braking force by the electromagnetic brake 20 in the case of performing drift driving while sending a specified identification signal No. 4 thereto to increase the braking force by the electromagnetic brake 20 in the case of giving a rotational resistance.

The running condition discriminator 257 also discriminates whether the simulated car is jumping or whether the simulated car has landed based on the position data of the simulated car, the vehicle speed data, the coordinate data of the roads 212 stored in the ROM 223, the angle of inclination of the bumps of the roads 212, the data on whether or not the simulated car will jump and jumping heights which are judged based on the vehicle speed calculated by the vehicle speed calculator 515 to be described later and the data on the angles of inclination of the bumps, and the programs concerning automotive behaviors in accordance with the automotive engineering. The running condition discriminator 257 sends a specified identification signal No. 5 to the current controller 1000 and the image processor 255 together with the jumping height to reduce a braking force by the electromagnetic brake 20 if the simulated car is jumping while sending a specified identification signal No. 6 thereto to increase the braking force by the electromagnetic brake 20 if the simulated car has already landed.

Further, the running condition discriminator 257 discriminates whether the simulated car will contact or collide with a wall of the building 213 or the like and whether the simulated car will explode upon collision based on the position data of the simulated car, the vehicle speed data, the coordinate data of the roads 212, the buildings 213 and the like near the roads 212 stored in the ROM 223, and the programs concerning automotive behaviors in accordance with the automotive engineering. The running condition discriminator 257 sends a specified identification signal No. 7 to the current controller 1000 and the image processor 255 to cause the electromagnetic brake 20 to intermittently create the braking force in order to brake the simulated car in accordance with a contacting timing in the possibility of contacting the wall, a specified identification signal No. 8 to cause the electromagnetic brake 20 to almost fully operate in the possibility of colliding with the wall, and a specified identification signal No. 9 thereto to cause the electromagnetic brake 20 to fully operate in the possibility of explosion upon collision.

The image processor 255 displays models such as the simulated car and the buildings near the roads on the monitor 2 after applying known three-dimensional image processings such as geometry processing and rendering, and displays the coordinate data of the roads 212 while rotating in a direction opposite from the changed direction. The image processor 225 also displays a specified screen based on an identification information from the road condition discriminator 256 or the running condition discriminator 257. For example, the simulated car is displayed free from shaking upon receipt of the identification signal No. 1 representing the asphalt road 201 while being so displayed as to shake upon receipt of the identification signal No. 2 representing the gravel road 201, the railway track 202 and the grassy field 204. These are basic displays. In the following cases, the image processor 255 adds specified displays to the basic displays. The image processor 255 displays the simulated car to slip upon receipt of the identification signal No. 3 representing drift driving; to incline outwardly upon receipt of the identification signal No. 4 for giving a rotational resistance according to the angle of rotation of the steering wheel 4; to jump to the jumping height which was inputted together upon receipt of the identification signal No. 5 representing a jumping state; to land with an impact corresponding to the jumping height upon receipt of the identification signal No. 6 representing landing; to contact the corresponding building or the like at a specific timing upon receipt of the identification signal No. 7 representing contact with the wall; to collide with the corresponding building or the like upon receipt of the identification signal No. 8 representing collision with the wall; and to explode upon collision with the corresponding building or the like upon receipt of the identification signal No. 9 representing explosion upon collision.

The current controller 1000 controls a current supplied to the electromagnetic brake 20 based on the identification information from the road condition discriminator 256 or the running condition discriminator 257. For example, the current controller 1000 executes such a control as to stop application of a current lest the electromagnetic brake 20 should operate upon receipt of the identification signal No. 1 representing the asphalt road 201 while executing such a control as to intermittently supply a current to the electromagnetic brake 20 so that the braking force of the electromagnetic brake 20 intermittently acts upon receipt of the identification signal No. 2. These controls are basic controls, and suitable controls are added to the basic controls in the following controls.

The current controller 1000 executes a control to reduce the braking force of the electromagnetic brake 20 upon receipt of the identification signal No. 3 representing drift driving; a control as to increase the braking force of the electromagnetic brake 20 upon receipt of the identification signal No. 4 for giving a rotational resistance corresponding to the angle of rotation of the steering wheel 4; a control to eliminate the braking force of the electromagnetic brake 20 upon receipt of the identification signal No. 5 representing a jumping state; a control to increase the braking force of the electromagnetic brake 20 upon receipt of the identification signal No. 6 representing landing; a control to increase the braking force of the electromagnetic brake 20 upon receipt of the identification signal No. 7 representing contact with the wall; a control to considerably increase the braking force of the electromagnetic brake 20 upon receipt of the identification signal No. 8 representing collision with the wall; and a control to further increase the braking force of the electromagnetic brake 20 upon receipt of the identification signal No. 9 representing explosion upon collision.

Figure 13:
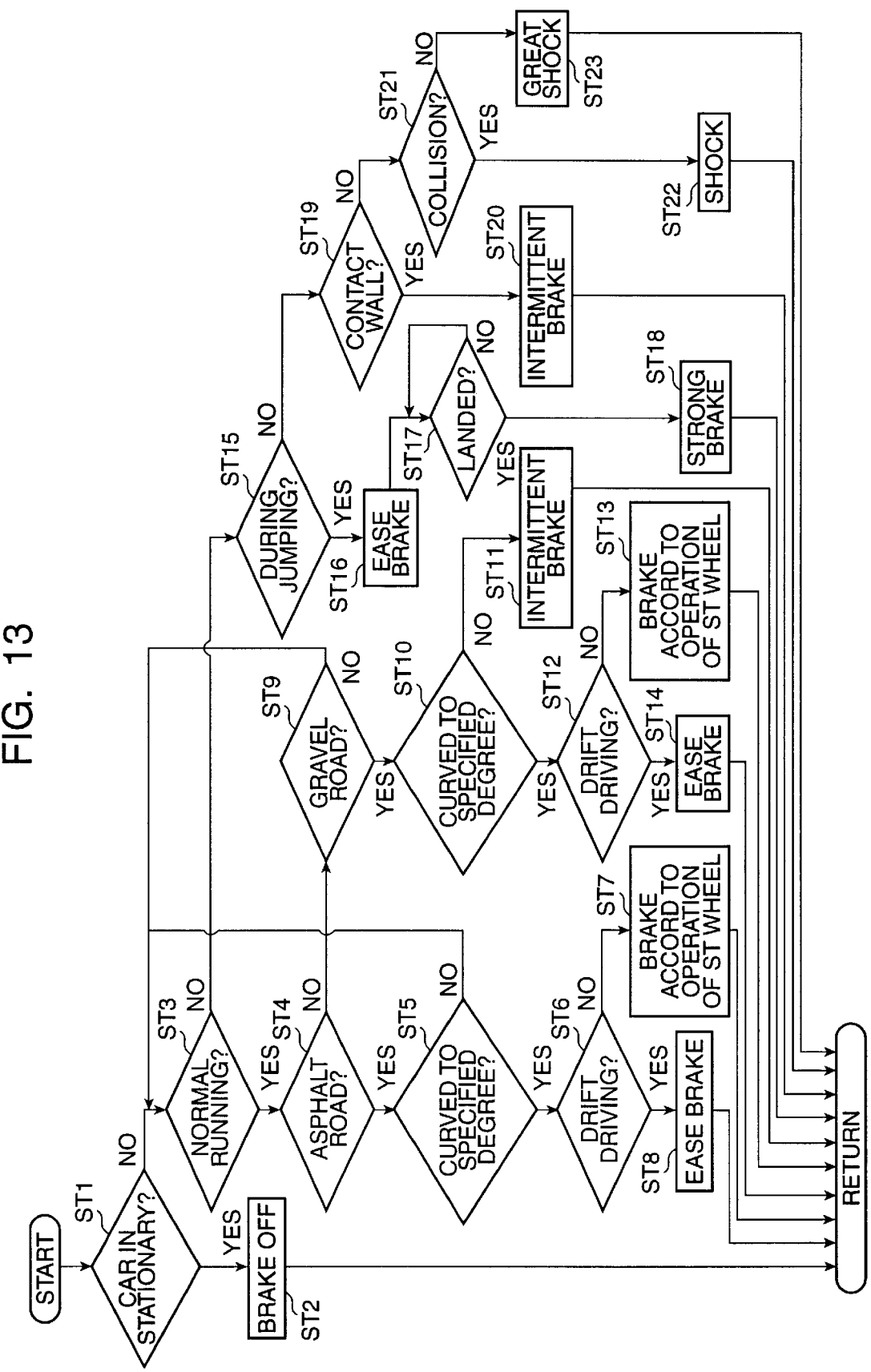
FIG. 13 is a flow chart showing contents of operations performed in the driving game machine.

Next, contents of operation in the driving game machine according to this embodiment are described with reference to FIG. 13.

When a coin is inserted into the coil slot 8 and the start switch 9 is pushed, the driving game starts and it is discriminated whether the simulated car is at a stop (Step ST1). The electromagnetic brake 20 is turned off (Step ST2) if the simulated car is at a stop. On the other hand, if the simulated car is not at a stop, i.e. running, it is discriminated whether the simulated car is normally running (Step ST3). If the simulated car is normally running, it is discriminated whether the road is an asphalt road (Step ST4). In the case of an asphalt road, it is discriminated whether this road is curved to a specified degree or larger (Step ST5).

This routine returns to Step ST3 if the discrimination result in Step ST5 is negative while it is discriminated whether the simulated car is executing drift driving (Step ST6) if it is affirmative. A current corresponding to the angle of rotation of the steering wheel 4 is outputted to the electromagnetic brake 20 (Step ST7) unless the simulated car is executing drift driving. On the other hand, a small current is outputted to the electromagnetic brake 20 regardless of the curving degree (Step ST8) if the simulated car is executing drift driving.

If the road is not an asphalt road in Step ST4, it is discriminated whether the road is a gravel road or the like and this routine returns to Step ST3 if it is not a gravel road or the like. On the other hand, if the road is a gravel road or the like, it is discriminated whether this road is curved to a specified degree or larger (Step ST10). The simulated car is shaken according to the road condition such as a gravel road (Step ST11) if the discrimination result in Step ST10 is negative. It is discriminated whether the simulated car is executing drift driving (Step ST12) if the discrimination result in Step ST10 is affirmative. A current corresponding to the angle of rotation of the steering wheel 4 is outputted to the electromagnetic brake 20 (Step ST13) unless the simulated car is executing drift driving. On the other hand, a small current is outputted to the electromagnetic brake 20 regardless of the curving degree (Step ST14) if the simulated car is executing drift driving.

If the simulated car is discriminated not to be normally running in Step ST3, it is discriminated whether the simulated car is jumping in Step ST15. If the simulated car is jumping, it is discriminated whether the simulated car has already landed (Step ST17) after the electromagnetic brake 20 is turned off (Step ST16). If the simulated car has already landed, a high current corresponding to a jumping height is outputted to the electromagnetic brake 20 (Step ST18).

On the other hand, if the simulated car is discriminated not to be jumping in Step ST15, it is discriminated whether the simulated car is contacting the wall of the building or the like in Step St19. If the simulated car is contacting the wall, a specified current is intermittently supplied to the electromagnetic brake 20 at a timing when the simulated car contacts the wall (Step ST20). On the other hand, if the simulated car is not contacting the wall, it is discriminated whether the simulated car will not exploded although colliding with the wall (Step ST21). If the discrimination result in Step ST21 is affirmative, a relatively high current is supplied to the electromagnetic brake 20 to give a shock (Step ST22). If the simulated car is discriminated to exploded upon collision with the wall in Step ST21, a considerably high current is supplied to the electromagnetic brake 20 to give a large shock in Step ST23.

In this embodiment, a reaction force given by the reaction force giving means 13 to return the steering wheel 4 to the neutral position is given to the steering shaft 11 when the steering wheel 4 is rotated about the steering shaft 11 from the neutral position, and a contact resistance is created due to a variation of the distance between the armature 23 and the lining 214 of the electromagnetic brake 20. The steering shaft 11 is subjected to a rotational resistance due to the contact resistance. Unlike the prior art mechanism for actively shaking the steering shaft and the steering wheel by creating a torque by means of an electric motor, this embodiment adopts such a mechanism for making it difficult to rotate the steering wheel 4 by means of the electromagnetic brake 20. Therefore, such a mechanism of this embodiment can have a suppressed occurrence of breakdown, can be made smaller and can be more inexpensively produced than conventional electric motors.

Further, in this embodiment, a contact resistance is created when the armature 23 and the lining 214 are brought into contact with each other by the displacement of the electromagnetic brake 20 and the armature 23, and the steering shaft 11 is subjected to a rotational resistance based on this contact resistance. Thus, it is sufficient to provide the clearance t corresponding to the displacement of the armature 23, which is advantageous in view of space utilization.

Further, since the armature 23 and the lining 214 are both formed to have an annular cross section and are arranged to surround the steering shaft 11, the braking unit can be made more compact.

Furthermore, in this embodiment, the wheel rotation detector 127 for detecting the rotated amount of the rotatable shaft from the neutral position is provided to face the steering shaft 11, and outputs the detected rotated amount to the current controller 1000, which outputs a current of a value corresponding to the inputted rotated amount. Accordingly, even if the force of the reaction force giving means for giving a reaction force to return the rotatable shaft to the neutral position to the rotatable shaft is not proper when the steering wheel 4 is rotated about the steering shaft 11 from the neutral position, the force can be corrected by the braking unit.

Further, this embodiment includes the control unit 225 for controlling the simulated roads and the simulated car displayed on the monitor 2, the control unit 225 outputs the identification signal concerning the road condition of the simulated road on which the simulated car is running to the current controller 1000, which in turn outputs a specified current in accordance with the received identification signal. Accordingly, a braking force corresponding to the road condition of the simulated road on which the simulated car is running acts on the steering wheel 4. Thus, when the road condition of the simulated road indicates a road surface having a low degree of friction, i.e. asphalt surface, a braking force from the electromagnetic brake 20 strongly acts on the rotatable shaft, making the steering wheel 4 heavier to turn. As a result, the game player can experience a simulated state of actual car driving.

Furthermore, in this embodiment, if the road condition of the simulated road on which the simulated car is running is bumpy, the braking force of the electromagnetic brake 20 intermittently acts. Therefore, a resistance which acts when the steering wheel 4 is turned becomes stronger and weaker. As a result, the game player can experience a simulated state of actual car driving.

Further, in this embodiment, the control unit 225 outputs the identification signal concerning the running condition of the simulated car running on the simulated road to the current controller 1000, which in turn outputs a specified current in accordance with the received signal. Thus, the game player can experience a simulated state of actual car driving when the simulated car jumps from the simulated road on which it is running, when the simulated car lands after jumping, when the simulated car contacts an obstacle image, when the simulated car collides with an obstacle image and when the simulated car explodes.

Although the types of the roads discriminated by the road condition discriminator 256 include the asphalt roads 201

(unhatched parts), the gravel roads 201, the railway track 202 and the grassy field 204 in the foregoing embodiment, the present invention is not limited thereto. Roads in forests, woods, bushes or sandy fields may be adopted or added.

Further, the foregoing embodiment adopts such a mechanism for electromagnetically deforming the leaf spring 24 and bringing the armature 23 displaced by the deformation of the leaf spring 24 into contact or away from the lining 214. However, the present invention is not limited to such a mechanism, and a mechanism for mechanically sliding the armature 23 to bring toward and away from the contacted member such as the lining 214 or like mechanism may be adopted.

Although the rotary device for a game machine is applied to the simulated car driving game in the foregoing embodiment, the present invention is not limited thereto and is similarly applicable to rotary devices of game machines for steering a simulated ship, a simulated airplane, a simulated tank or of a game machine for steering a simulated vehicle other than the above simulated car. In such cases, if it is, for example, assumed that a simulated ship is a simulated moving object and a simulated ocean and a simulated river are moving environments, the current controller outputs a suitable current to adjust the braking force of the braking unit according to the height of waves, a sea route, etc. and according to a moving speed of the simulated moving object with respect to the moving environment in a specified moving condition of porting the helm or turning it to starboard. Further, if it is, for example, assumed that a simulated airplane is a simulated moving object and simulated mountains, spacings between simulated buildings and simulated valleys are moving environments, the current controller outputs a suitable current to adjust the braking force of the braking unit according to altitude differences and degrees of curving of an air route and according to a moving condition of the simulated moving object with respect to the moving environments such as a turning speed. Further, if it is, for example, assumed that a simulated tank is a simulated moving object and simulated mountains and like undulating plains are moving environments, the current controller outputs a suitable current to adjust the braking force of the braking unit according to height differences, a course, etc. in the simulated mountings as the moving environments and according to a moving condition of the simulated moving object with respect to the moving environments such as a turning speed.

This application is based on Japanese priority application serial no. 2000-061718 filed in Japan on Mar. 7, 2000, the contents of which are hereby incorporated therein.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A rotary device for a game machine, comprising:
a rotatable member rotatable by a game player,
a rotatable shaft having the rotatable member mounted thereon,
a bias unit for biasing the rotatable shaft to its neutral position thereof, and
a braking unit having a contacting member and a contacted member which are opposed to each other and adapted to give a rotational resistance to the rotatable shaft based on a contact resistance created by a variation of a distance between the contacting member and the contacted member.

2. A rotary device according to claim 1, wherein the braking unit comprises an electromagnetic force generating portion provided with the contacted member and adapted to create an electromagnetic force toward the contacting member, and an electromagnetic force receiving portion provided with the contacting member which displaces upon receipt of the electromagnetic force, and wherein one of the electromagnetic force generating portion and the electromagnetic force receiving portion is mounted on the rotatable shaft and the other thereof is mounted on a non-rotary portion near the rotatable shaft.

3. A rotary device according to claim 1, wherein the contacting member and the contacted member are both formed to have an annular cross section and are arranged to surround the rotatable shaft.

4. A rotary device according to claim 2, further comprising a current controller for controlling a value of a current to be supplied to the electromagnetic force generating portion, wherein the intensity of the electromagnetic force generated by the electromagnetic force generating portion is adjusted by the current from the current controller to bring the contacting member and the contacted member into contact with or away from each other and to change the intensity of the contact resistance.

5. A rotary device according to claim 4, further comprising a rotated amount detecting means for detecting a rotated amount of the rotatable shaft from its neutral position, wherein the rotated amount detecting means outputs the detected rotated amount to the current controller, and the current controller supplies a current of a value corresponding to the received rotated amount.

6. A game machine comprising:
a display for displaying a virtual space and a simulated moving object moving in the virtual space;
a controller for controlling the movement of the simulated moving object, and the controller outputs a signal representing a moving environment for the simulated moving object;
a rotary device including:
a rotatable member rotatable by a game player;
a rotatable shaft having the rotatable member mounted thereon;
a bias unit for biasing the rotatable shaft to its neutral position thereof;
a braking unit having an electromagnetic force generating member and an electromagnetic force receiving member which are opposed to each other and adapted to apply a rotational resistance to the rotatable shaft and the electromagnetic force receiving member is displaced to be in contact with the electromagnetic force generating member when the current is supplied to the electromagnetic force generating member and wherein one of the electromagnetic force receiving member and the electromagnetic force generating member is mounted on the rotatable shaft and the other thereof is mounted on a non-rotary portion near the rotatable shaft; and
a current controller for controlling a value of the current supplied to the electromagnetic force generating member such that the rotational resistance applied to the rotatable shaft increases as the supplied current increases and the current controller supplies a specified current in accordance with the received signal representing the moving environment from the controller.

7. A game machine according to claim 6, wherein the current controller intermittently supplies a current when the moving environment vertically shakes the simulated moving object.

8. A game machine comprising:
- a display for displaying a virtual space and a simulated moving object moving in the virtual space;
- a controller for controlling the movement of the simulated moving object, and the controller outputs a signal representing a moving condition of the simulated moving object in a certain moving environment;
- a rotary device including:
  - a rotatable member rotatable by a game player;
  - a rotatable shaft having the rotatable member mounted thereon;
  - a bias unit for biasing the rotatable shaft to its neutral position thereof;
  - a braking unit having an electromagnetic force generating member and an electromagnetic force receiving member which are opposed to each other and adapted to apply a rotational resistance to the rotatable shaft and the electromagnetic force receiving member is displaced to be in contact with the electromagnetic force generating member when the current is supplied to the electromagnetic force generating member and wherein one of the electromagnetic force receiving member and the electromagnetic force generating member is mounted on the rotatable shaft and the other thereof is mounted on a non-rotary portion near the rotatable shaft; and
- a current controller for controlling a value of the current supplied to the electromagnetic force generating member such that the rotational resistance applied to the rotatable shaft increases as the supplied current increases and the current controller supplies a specified current in accordance with the received signal representing the moving condition from the controller.

9. A game machine according to claim 8, wherein the moving environment includes a normal run on an asphalt road.

10. A game machine according to claim 8, wherein the moving condition includes a jumping state of the simulated moving object and a landing state of the simulated moving object.

11. A rotary device for a game machine, comprising:
- a rotatable member rotatable by a game player,
- a rotatable shaft having the rotatable member mounted thereon,
- a bias unit for biasing the rotatable shaft to its neutral position thereof,
- a braking unit having a contacting member and a contacted member which are opposed to each other and switchable between a contacting state in which the contacting member and the contacted member are in contact with each other and a non-contacting state in which the contacting member is free from contact with the contacted member, the contacting member and the contacted member being adapted to give a rotational resistance to the rotatable shaft when the braking unit is in the contacting state, the braking unit including:
  - an electromagnetic force generating portion provided with the contacted member and adapted to create an electromagnetic force toward the contacting member, and
  - an electromagnetic force receiving portion provided with the contacting member which is displaced upon receipt of the electromagnetic force from the electromagnetic force generating portion, and wherein one of the electromagnetic force generating portion and the electromagnetic force receiving portion is mounted on the rotatable shaft and the other thereof is mounted on a non-rotary portion near the rotatable shaft, and
- a controller for controlling the rotational resistance applied to the rotatable shaft.

12. A rotary device according to claim 11, further comprising a current controller for controlling a value of a current to be supplied to the electromagnetic force generating portion, wherein the intensity of the electromagnetic force generated by the electromagnetic force generating portion is adjusted by the current from the current controller to bring the contacting member and the contacted member into contact with or away from each other and to change the intensity of the contact resistance.

13. A rotary device according to claim 12, further comprising a rotated amount detecting means for detecting a rotated amount of the rotatable shaft from its neutral position, wherein the rotated amount detecting means outputs the detected rotated amount to the current controller, and the current controller supplies a current of a value corresponding to the received rotated amount.

\* \* \* \* \*